US008108825B2

(12) United States Patent
Goodwin et al.

(10) Patent No.: US 8,108,825 B2
(45) Date of Patent: *Jan. 31, 2012

(54) CREATING CUSTOMIZED APPLICATIONS USING TEMPLATES HAVING POINTS OF VARIABILITY

(75) Inventors: James Patrick Goodwin, Beverly, MA (US); Christina P. Lau, Scarborough (CA); Margaret M. O'Connell, Allston, MA (US); Douglass J. Wilson, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 869 days.

This patent is subject to a terminal disclaimer.

(21) Appl. No.: 12/172,659

(22) Filed: Jul. 14, 2008

(65) Prior Publication Data
US 2009/0178020 A1    Jul. 9, 2009

Related U.S. Application Data

(62) Division of application No. 10/686,059, filed on Oct. 15, 2003, now Pat. No. 7,412,687.

(51) Int. Cl.
*G06F 9/44* (2006.01)
*G06F 9/445* (2006.01)
*G06F 19/00* (2011.01)

(52) U.S. Cl. ........ 717/104; 707/101; 707/107; 707/162; 707/168; 707/177; 700/107

(58) Field of Classification Search .................. None
See application file for complete search history.

(56) References Cited

U.S. PATENT DOCUMENTS

| 7,412,687 | B2* | 8/2008 | Goodwin et al. ............ 717/104 |
| 2005/0085937 | A1* | 4/2005 | Goodwin et al. ............ 700/107 |
| 2006/0150178 | A1* | 7/2006 | Jerrard-Dunne et al. ..... 717/168 |
| 2007/0150852 | A1* | 6/2007 | Balderas et al. ............ 717/104 |
| 2007/0150882 | A1* | 6/2007 | Pena et al. .................... 717/168 |
| 2007/0234273 | A1* | 10/2007 | O'Connell et al. ........... 717/101 |

OTHER PUBLICATIONS

Mietzner et al., "Defining Composite COnfigurable SaaS Application Packages Using SCA, Variability Descriptors and Multi-tenancy Patterns", 2008, IEEE, 2008 Third International Conference on Internet and Web Applications and Services (2008), pp. 156-161.*
Cortés et al., "A Rule-Based Approach to Framework Evolution", ETH Zurich, Chair of Software Engineering, 2006, pp. 83-103 <http://www.jot.fm>.*
Mietzner et al., "Using Variablity Descriptors to Describe Customizable SaaS Application Templates", Technischer Bericht (Report) Jan. 2008, Jan. 18, 2008, pp. 1-27.*

* cited by examiner

*Primary Examiner* — Thuy Dao
*Assistant Examiner* — Ben Wang
(74) *Attorney, Agent, or Firm* — Steven M. Greenberg, Esq.; Carey, Rodriguez, Greenberg & O'Keefe

(57) ABSTRACT

A method, system, apparatus and article of manufacture for producing a customized application. In a preferred method of the invention, a selection of components can be identified which are to be deployed to form the customized application. Within the selection of components, points of variability can be specified which can be assigned values when deploying the selection of components. The identified selection of components and the specified points of variability can be persisted in a template. Subsequently, the template can be processed to deploy the identified selection of components, to prompt for values to be assigned to the points of variability, and to configure the identified selection of components with the values at the points of variability thereby producing the customized application.

4 Claims, 4 Drawing Sheets

CREATING CUSTOMIZED APPLICATIONS USING TEMPLATES HAVING POINTS OF VARIABILITY

CROSS-REFERENCE TO RELATED APPLICATIONS

This application is a Continuation of U.S. application Ser. No. 10/686,059, filed on Oct. 15, 2003, which is incorporated herein by reference in its entirety.

BACKGROUND OF THE INVENTION

1. Statement of the Technical Field

The present invention relates to the field of component-based computing and more particularly to automated application construction by configuring a discrete set of application components.

2. Description of the Related Art

Computer software applications justify the globally ravenous appetite for expensive computing technology. As the utility of computer software becomes more apparent to the least technically inclined, computing technology becomes more of a natural element of life without which productivity seemingly would grind to a halt much as would be the case without the benefit of telecommunications. Along with enhanced productivity associated with computer software, so too has the demand for more end-user specific applications increased. In this regard, no longer will it suffice that a single embodiment of a computer program solves a general problem. Rather, end-users have come to expect more particular configurations for computer software to address unpredictable end-user problem spaces.

Decades ago, most end-user specific problems had been addressed through customizable spreadsheet, word processing and database applications. Specifically, end-users could customize each of these core office productivity applications using a strategic mix of macros, preformatted document styles and computing formulas embedded within documents. Interestingly, it is well-known that even today, the world's leading personal computer manufacturer manages the complete roll-out of each new product within a single spreadsheet littered with relative references to cells within the spreadsheet. Nevertheless, the utility of a customized "application" formed through the manipulation and configuration of a conventional office productivity suite cannot scale to the enterprise.

The distribution of enterprise-wide computing applications has rested largely upon the shoulders of distributable computing components which once retrieved from a network code base can execute within the virtual environment of the conventional content browsing client. More particularly, applications can be formed through the unique arrangement of discrete application components which can be distributed on demand to client computing devices scattered about the enterprise. To support the on demand distribution of the discrete application components, application servers have formed the backbone of the distributed application and function to manage the arrangement and distribution of application components to form a highly customized enterprise application.

Despite the flexibility of the modern application server, however, the configuration of an enterprise application through the combination of discrete application components can involve a requisite level of computing expertise not prevalent throughout each enterprise. Consequently, the customization of an enterprise application can involve the expenditure of vast sums in order to support the development and maintenance of a customized enterprise computing application. The expenditure of vast sums to support the development and maintenance of a customized enterprise computing application, however, represents a substantial departure from the notion of ages gone by that an application can be customized by an unsophisticated end user through the generation of a document template as had been the case in the venerable spreadsheet. Worse yet, in today's development environment, often those who have the deepest knowledge of the business goals of an application specification, lack the most basic programming skills necessary to customize an enterprise computing application.

SUMMARY OF THE INVENTION

The present invention addresses the deficiencies of the art in respect to application development and provides a novel and non-obvious method, system and apparatus for customizing an application through the production of a template which expresses points of variability in customizing the application. More specifically, in a method for customizing an application, a selection of components can be identified which are to be deployed to form the customized application. Within the selection of components, points of variability can be specified which can be assigned values when deploying the selection of components. The identified selection of components and the specified points of variability can be persisted in a template. Subsequently, the template can be processed to deploy the identified selection of components, to prompt for values to be assigned to the points of variability, and to configure the identified selection of components with the values at the points of variability thereby producing the customized application.

To support the foregoing methodology, a system for customizing an application can be provided in accordance with a preferred aspect of the present invention. The system can include a template interface prototyped both for exposing content included within components implementing the template creation interface, and also for deploying the components implementing the template. A template creation process can be coupled to the template interface and can include a configuration for writing a template persisting both references to a selection of components to be deployed to form the customized application and also points of variability which can be assigned values when deploying the selection of components. Finally, a template deployment process can be programmed to produce the customized application based upon a template written by the template creation process.

In more specific illustration, a method for producing a template describing a customized configuration of an application can include selecting a set of components to be deployed in the customized configuration. Within the set, points of variability can be specified which can vary in each deployment of the customized configuration. Dependencies among the set of components can be identified, the identified dependencies forming a hierarchy of components to be deployed in the customized configuration. Finally, a template can be written to storage which both enumerates the specified points of variability, and also lists the selected set of components while preserving the hierarchy within the listing in the template.

By comparison, a method for customizing an application can include loading a template describing a customized configuration of the application and locating within the template a set of components arranged in a hierarchy of dependent components which are to be deployed in a customized configuration. A listing of points of variability which can vary in each deployment of the customized configuration can be further located within the template. Consequently, the set of components can be deployed, and more importantly, an end user can be prompted for values for the points of variability based upon the listing of points of variability. The values provided by the end user can be applied to the points of variability and control of the customized configuration can be returned to the end user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for customizing applications based upon a template specification for a customized application configuration. Significantly, the template can permit the variable establishment of configuration parameters for the application so that a customized application specified by the template can be further customized at run time through these "points of variability". In particular, the template can persist the state of configuration of an application allowing for some variability in the configuration of components forming the application.

Figure 1:
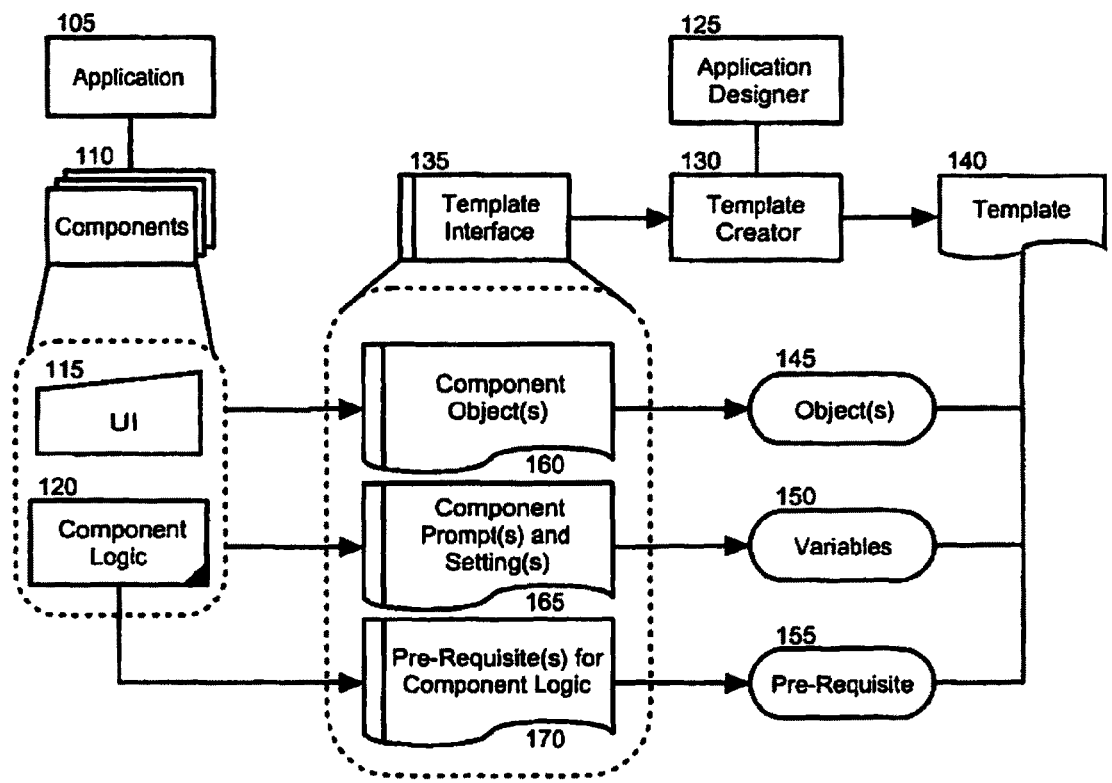
FIG. 1 is block diagram of a system for creating a customized application using templates having points of variability.

In further illustration thereof, FIG. 1 is block diagram of a system for creating a customized application using templates having points of variability. The system can include an application 105 including a multiplicity of application components 110. The application 105 can reflect a customized configuration of a generic software system particular to a specific problem space. In furtherance of this purpose, the application can include a collection of data stores, logical components, end user roles, end user activities, and application tools. Each can be coordinated with one another to form the basis of an application instance having a specific configuration.

Different ones of the components 110 can include component logic 120 dictating the behavior of the components 110. Additionally, to the extent that a view can be associated with one or more of the components 110, a user interface 115 can further be provided. To support the operation of the application 105 and the respective component logic 120 of the components 110, an application server (not shown) can be provided. Optionally, a portal server (also not shown) further can be provided to support user interaction with the component logic 120. In any case, as it will be recognized by the skilled artisan, a particular configuration can be required to coordinate the operation of the application 105 in order to produce a computing experience applicable to a specific problem space. Yet, the lack of a rigid, constant arrangement and configuration of the components 110 can lend itself to a flexibility in producing multiple different computing experiences directed to a unique problem space.

Importantly, to reproduce a specific arrangement and configuration of the components 110 of the application 105 as a persistent solution applicable to a particular problem space, a template 140 can be produced to reflect the unique arrangement and configuration of the components 110. Specifically, a template creation process 130 coupled to an application designer 125 can generate elements of the template 140 which subsequently can be used to reproduce the specific arrangement and configuration of the components 110. In particular, the elements can include a component specification 145 of the components 110 arranged to form the application 105, one or points of variability 150 within the components 110, and a specification of pre-requisites 155 required for the operation of the application 105 as configured.

The component specification 145 can include one or more references to those ones of the components 110 forming the application 105 specified by the template 140. The points of variability 150, by comparison, can include respective references to variable elements and of the configuration of the component objects 160 referenced in the component specification 145. The variable elements can include configuration settings and parameters and can be range limited within the template 140. Finally, the pre-requisites specification 155 can indicate within the template 140 those pre-requisite resources 170 which are required for the operation of the application 105 as configured and described in the template 140. Exemplary pre-requisite resources 170 can include data store accessibility logic, content transformation logic and the like.

Figure 4:
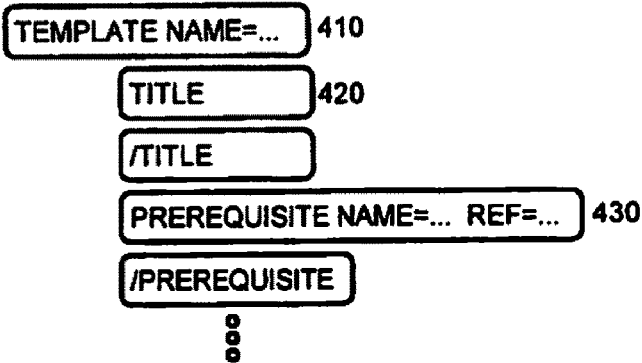

In further illustration, FIG. 4 is a schematic illustration of a template configured for use with the system of FIG. 1. The template can include markup language formatted directives and can incorporate a pre-defined set of tags such as is well known in the technical space of the extensible markup language (XML). In any case, the template can include a template name 410 encapsulating a title 420 for the customized application and a list of pre-requisite resources 430. A set of points of variability 440 further can be specified as can the type for each point of variability, a reference to an editor tool for modifying the point of variability, and whether or not a specification of the point of variability is required for the customization of the application. One or more prompts 450 can be provided for soliciting a value for the point of variability 440 as can a default value for the point of variability 440, or an acceptable range of values 460 for the point of variability 440. Finally, a set of component objects 470 and their respective object data 480 can be specified whose customized arrangement can form the basis of the customized application.

Returning to the system of FIG. 1, to facilitate the creation of the template 140, a template interface 135 can be provided for implementation by the components 110 of the application 105. The template interface 135 can include a specification of methodologies used by the template creation process 130 to describe the individual components 110 in terms of name, invocation process, pre-requisite resources and configuration parameters. By implementing the template interface 135, the component objects 160 of the application 105 can permit their inclusion in the template creation process 130. In yet further illustration, Appendix A includes an exemplary listing of the template interface 135.

Figure 2:
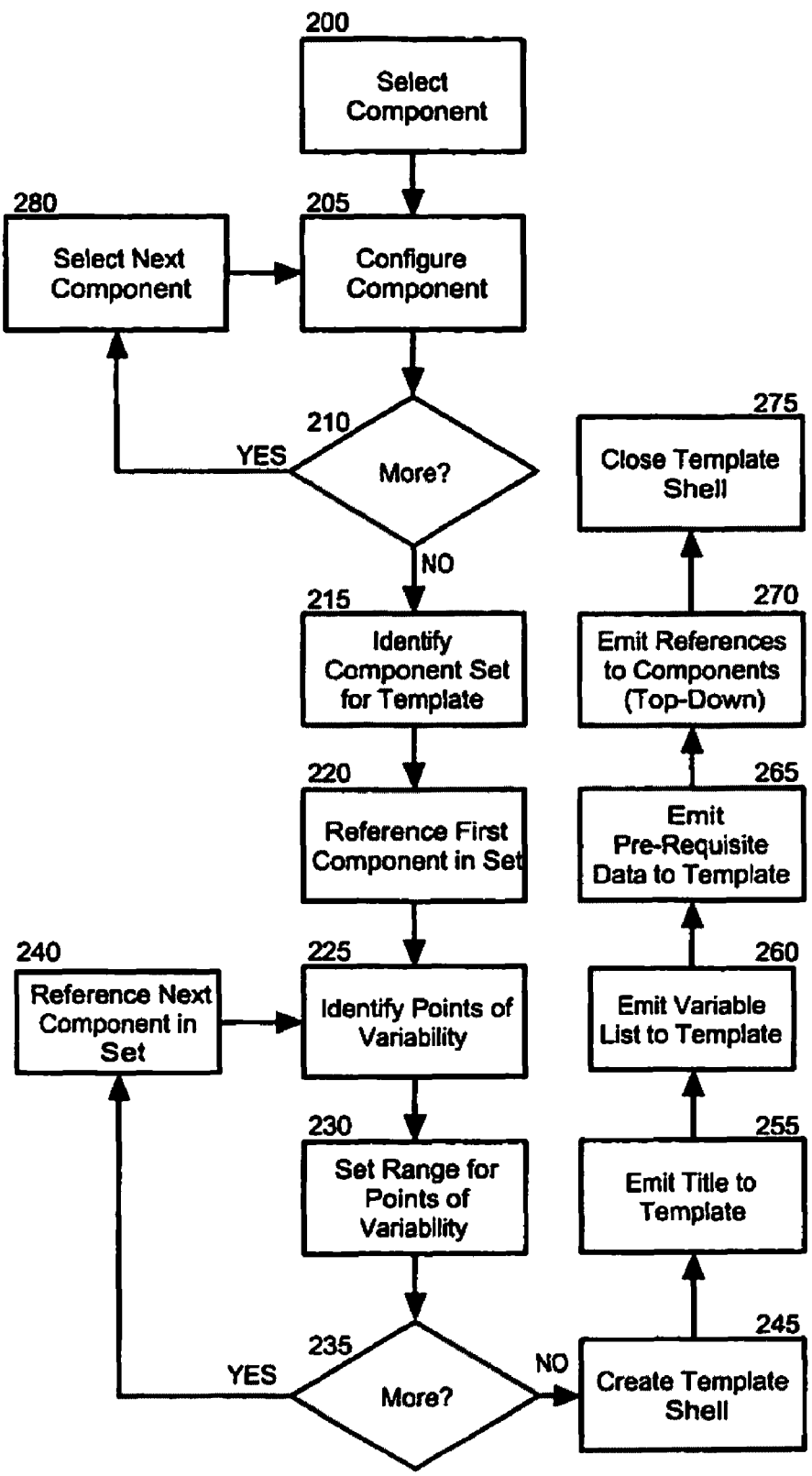
FIG. 2 is a flow chart illustrating a process for producing a template having points of variability.

Turning now to the specific operation of the template creation process 130, FIG. 2 is a flow chart illustrating a process for producing a template having points of variability. Beginning in block 200 and continuing through blocks 205, 210 and 280, each component in the application can be configured as desired to produce a customized application. In this regard, the configuration process can include specifically arranging a selection of the components of the application to serve a specific problem space. In addition, component parameters can be established to further suit the specific problem space. As an example, field labels and the arrangement of elements in a form can be modified to better suit data input and review for a customized version of the application.

In any case, once the application has been customized through the specific configuration, in block 215 the set of components to be arranged to form the application can be identified to the template creation process. Subsequently, in blocks 220 through 240, within each identified component, points of variability can be specified as can an allowable range of values or a default value for each point of variability. In decision block 235, when no further points of variability remain to be identified within the set of identified components, all other configuration elements for the customized configuration can be considered fixed and in block 245 a template shell can be created for the customized configuration of the application and its respective points of variability.

In particular, in block 255 a title for the customized arrangement and configuration can be "emitted" to the template. In this regard, the title can be written to the template file, for example, in the form of title content demarcated by markup language tags conforming to a pre-formed document type definition for the template. Additionally, in block 260 the points of variability of block 225 and their respective ranges or default values of block 230 can be emitted to the template in block 260. In block 265, the pre-requisite data for the application can be emitted to the template as well in order to indicate those resources which are required for the suitable operation of the application as configured in the customized arrangement.

Significantly, the collection of components specified in block 215 can be traversed through the template creation process. In block 270, for each component in the collection, a reference to the component can be written to the template based upon which the component can be accessed when customizing the application for operation in accordance with the persisted definition of the customized application. To the extent that the components are inter-related through a series of interdependencies, the references to the components can be emitted to the template in a top-down manner. Once the references to the components have been emitted, the template shell can be closed in block 275 and a reproducible representation of the customized application can be persisted therein.

It will be recognized by the skilled artisan that the components of the application may not inherently include an interface suitable for integration with the template creation process of the present invention. Consequently, where feasible, the individual components can implement an interface associated with the template creation process so as to permit the template creation process to query the components for their contents and characteristics. Once again, in a preferred aspect of the present invention, the exemplary interface listed in Appendix A can serve such a function. Yet, where a component has not implemented the preferred interface, a proxy can be used in its place to extract the template content.

Figure 3:
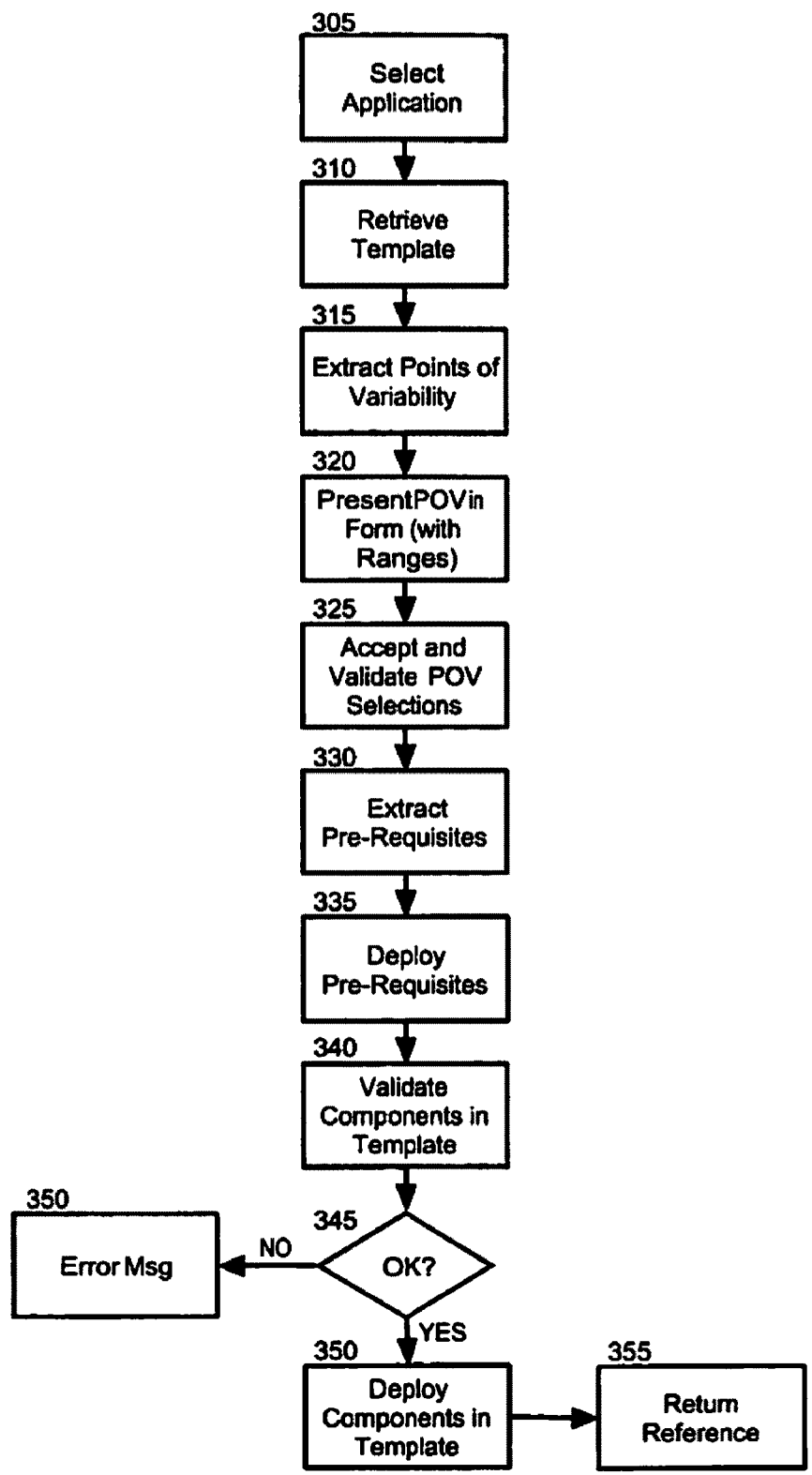
FIG. 3 is a flow chart illustrating the creation of a customized application using a template produced through the process of FIG. 2; and, FIG. 4 is a schematic illustration of a template configured for use with the system of FIG. 1.

Once the template has been created, at any subsequent time, the customized application can be recalled through a processing of the template in which the customized application had been persisted. In this regard, FIG. 3 is a flow chart illustrating the creation of a customized application using a template produced through the process of FIG. 2. Beginning in block 305, a particular customized application can be selected for recall and in block 310 an associated template associated with the selected customized application can be retrieved. In block 315 the points of variability within the template can be extracted as can a set of associated default values or ranges for the points of variability.

Notably, within the template, a set of prompts can be included for presentation to the end user when soliciting values for the points of variability. Accordingly, in block 320 the prompts can be presented through a form to receive values for the points of variability. Within the form, the acceptable ranges and any default values further can be presented in association with the points of variability. In any case, in block 325 each of the selections for the individual points of variability can be accepted and validated for consistency with the acceptable range of values.

In block 330, the pre-requisite resources for the arrangement of the components and operation thereof can be extracted from the template. Subsequently, each of the referenced pre-requisite resources can be deployed. In block 340, each of the components specified in the template can be validated. To the extent that the components are arranged in a hierarchy of dependent components, the hierarchy can be descended recursively both during the validation phase and during the deployment phase. When each component has been deployed, a resulting reference can be passed to components which depend upon the deployed component.

Notably, if in decision block 345 the components fail to validate successfully, in block 350 the error can be handled accordingly. Otherwise, in block 350 each of the components can be deployed as specified by the template and the accepted points of variability can be applied thereto. Finally, in block 355 a reference to the application can be returned as an instance in the template management application and through which interaction with the application can commence.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A machine readable storage having stored thereon a computer program for producing a template describing a customized configuration of an application, the computer program comprising a routine set of instructions for causing the machine to perform the steps of:
   selecting a set of components to be deployed in the customized configuration;
   specifying within said set, points of variability for the variable establishment of configuration parameters for the customized application which can vary when deploying of the customized configuration;
   identifying dependencies among said set of components, said identified dependencies forming a hierarchy of components to be deployed in the customized configuration; and,
   writing a template both enumerating said specified points of variability, and also listing said selected set of components while preserving said hierarchy within said listing in said template, wherein said listing step comprises the steps of:
   accessing a template interface implemented by said set of components to permit access to content encapsulated by said set of components; and,
   where a component within said set of components has not implemented said template interface, accessing said encapsulated content through a proxy to said component within said set of components.

2. A machine readable storage having stored thereon a computer program for producing a template describing a customized configuration of an application, the computer program comprising a routine set of instructions for causing the machine to perform the steps of:
   selecting a set of components to be deployed in the customized configuration;
   specifying within said set, points of variability for the variable establishment of configuration parameters for the customized application which can vary when deploying of the customized configuration;
   identifying dependencies among said set of components, said identified dependencies forming a hierarchy of components to be deployed in the customized configuration; and,
   writing a template both enumerating said specified points of variability, and also listing said selected set of components while preserving said hierarchy within said listing in said template, wherein said preserving step comprises the step of nesting component references in said listing in said template according to relative positions in said hierarchy of said set of components.

3. A machine readable storage having stored thereon a computer program for customizing an application, the computer program comprising a routine set of instructions for causing the machine to perform the steps of:
   loading a template describing a customized configuration of the application
   locating within said template a set of components arranged in a hierarchy of dependent components which are to be deployed in a customized configuration;
   further locating within said template, a listing of points of variability for the variable establishment of configuration parameters for the customized application which can vary when deploying of the customized configuration;
   deploying said set of components;
   prompting an end user for values for said points of variability and applying said values to said points of variability; and,
   returning control of the customized configuration to said end user, wherein said locating step comprises the steps of:
   descending said hierarchy recursively; and,
   deploying each of component in said hierarchy beginning with components in said set which are not dependent upon any other component in said hierarchy, and continuing through to at least one root component which is dependent upon all other components disposed below said at least one root component in said hierarchy.

4. A machine readable storage having stored thereon a computer program for customizing an application, the computer program comprising a routine set of instructions for causing the machine to perform the steps of:
   loading a template describing a customized configuration of the application
   locating within said template a set of components arranged in a hierarchy of dependent components which are to be deployed in a customized configuration;
   further locating within said template, a listing of points of variability for the variable establishment of configuration parameters for the customized application which can vary when deploying of the customized configuration;
   deploying said set of components;
   prompting an end user for values for said points of variability and applying said values to said points of variability; and,
   returning control of the customized configuration to said end user, wherein said deploying step comprises the steps of:
   accessing a template interface implemented by said set of components to permit access to content encapsulated by said set of components; and,
   where a component within said set of components has not implemented said template interface, accessing said encapsulated content through a proxy to said component within said set of components.

* * * * *